United States Patent [19]
Pong et al.

[11] Patent Number: 5,451,071
[45] Date of Patent: Sep. 19, 1995

[54] BICYCLE FRAME

[75] Inventors: Alex Pong, Langley; Skooks Pong, Freeland, both of Wash.

[73] Assignee: Cannondale Corporation, Georgetown, Conn.

[21] Appl. No.: 378,923

[22] Filed: Jan. 25, 1995

Related U.S. Application Data

[63] Continuation of Ser. No. 122,098, Sep. 16, 1993, abandoned.

[51] Int. Cl.[6] .......................... B62K 25/04; B62K 3/10
[52] U.S. Cl. ............................ 280/281.1; 280/288.3; 280/283; 280/284; 280/285; 280/286; 280/277; 280/276; 280/275; 280/274
[58] Field of Search ............... 280/281.1, 283, 288.3, 280/274, 275, 284, 285, 288, 286, 277, 276; 180/219, 205, 206, 207; 264/257, 258

[56] References Cited

U.S. PATENT DOCUMENTS

| | | | |
|---|---|---|---|
| 2,089,889 | 8/1937 | Giordani | 280/288.3 |
| 2,470,441 | 5/1949 | Maier et al. | 280/288.3 |
| 4,139,072 | 2/1979 | Dawson | 280/288.3 X |
| 4,548,422 | 10/1985 | Michel et al. | 280/288.3 |
| 4,923,203 | 5/1990 | Trimble et al. | 280/281.1 X |
| 4,982,975 | 1/1991 | Trimble | 280/281.1 |
| 5,011,172 | 4/1991 | Bellanca et al. | 280/281.1 |
| 5,295,702 | 3/1994 | Buell | 280/284 |
| 5,320,375 | 6/1994 | Reeves et al. | 280/284 |
| 5,332,246 | 7/1994 | Buell | 280/284 |

FOREIGN PATENT DOCUMENTS

| | | | |
|---|---|---|---|
| 0102347 | 3/1984 | European Pat. Off. | 280/281.1 |
| 2683500 | 5/1993 | France | 280/281.1 |
| 0803512 | 4/1951 | Germany | 280/281.1 |
| 4126761 | 2/1993 | Germany | 180/219 |
| 0237280 | 9/1989 | Japan | 180/219 |
| 0534825 | 3/1941 | United Kingdom | 280/288.3 |

*Primary Examiner*—Mitchell J. Hill
*Assistant Examiner*—F. Zeender
*Attorney, Agent, or Firm*—Brumbaugh, Graves, Donohue & Raymond

[57] ABSTRACT

A bicycle frame comprises a tapered nose portion having a front sleeve adapted to receive a front wheel-mounting member, a center portion having a tapered upper arm adapted to support a seat and a tapered lower arm having a bottom sleeve adapted to support a bottom bracket/crank assembly, and a tail portion having a rear sleeve adapted to support a rear wheel. The frame may be modular, and some or all of the portions may be of monocoque construction.

19 Claims, 4 Drawing Sheets

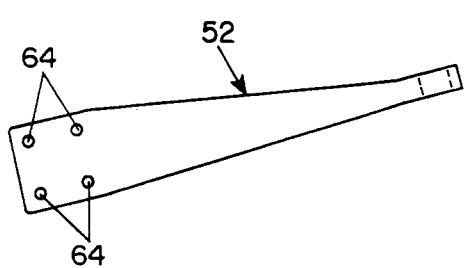
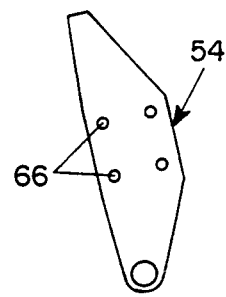
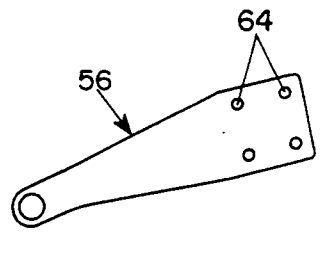
FIG. 6  FIG. 7  FIG. 8
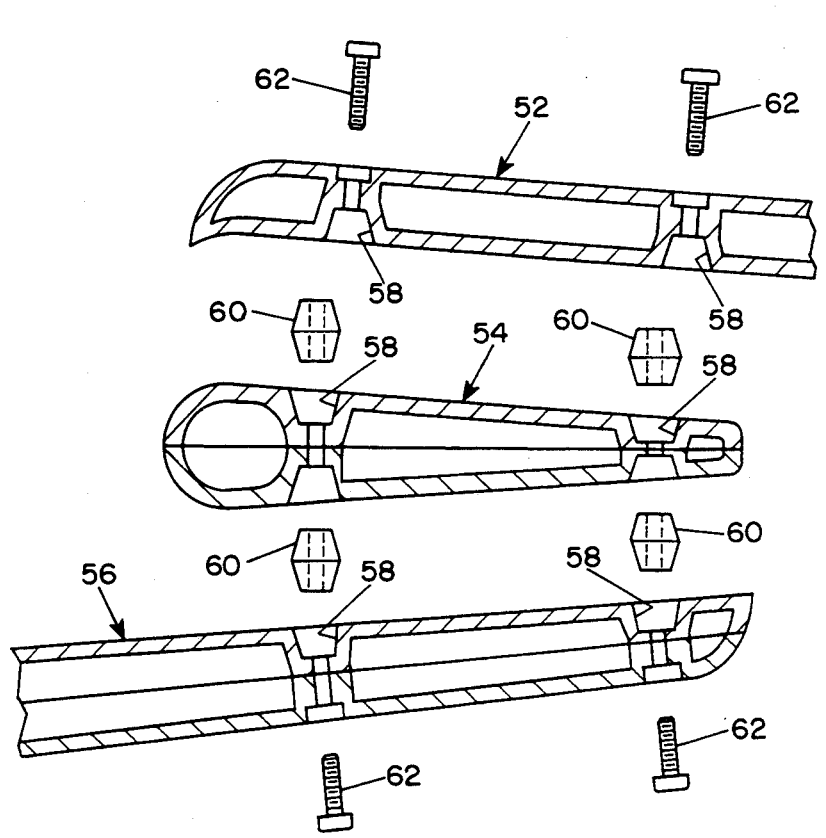
FIG. 9

BICYCLE FRAME application is a continuation of application Ser. No. 08/122,098, filed on Sep. 16, 1993, now abandoned.

BACKGROUND OF THE INVENTION

Bicycle frames have evolved over many decades into highly efficient structures. They are strong, stiff, and amazingly light in weight. Despite numerous proposals of all manners of structural forms using a variety of materials, most bicycles being sold these days have frames built up from metal tubes. Almost universally, metal tube frames have a front triangle consisting of a top tube, a down tube, a seat tube, and a rear triangle consisting of the seat tube, chain stays, and seat stays. Triangles are notoriously good structural building blocks for frames of all types, and the modern bicycle frame makes good use of them.

The current popularity of mountain bikes has resulted in some departures from the traditional frames, including additional small triangles, active suspensions, which often break up the rear triangle, and other variations. Many of the changes in frames have, among other things, resulted in increased costs of manufacture. The constraints of using tubes in bicycle frames has, in the case of relatively complicated frames, contributed to greater complexity than necessary—hence, the cost increases. The more complex frames also are generally somewhat heavier than conventional two-triangle frames or require adding weight in other components, such as suspensions. The manufacture of bicycle frames from tubes is often quite labor intensive, particularly in the case of welded frames which require intricate welding procedures to prevent distortion and finishing of welds for good appearance.

SUMMARY OF THE INVENTION

One object of the present invention is to provide a bicycle frame that is highly efficient, in terms of use of material, putting strength where it is needed and making use of the geometries of frame portions to vary strengths and save weight. Another object is to provide a frame of modular construction so that it can be made and shipped knocked down and easily assembled by a retailer or purchaser. The modular construction also permits different size frames to be produced with some parts shared among the different sizes. And the modular construction also enables replacement of frame parts that become damaged and reuse of undamaged frame parts in a repaired frame.

The foregoing objects are attained, in accordance with the present invention, by a bicycle frame comprising a tapered nose portion having a front sleeve adapted to receive a front wheel-mounting member, a center portion having a tapered upper arm adapted to support a seat and a tapered lower arm having a bottom sleeve adapted to support a bottom bracket/crank assembly, and a tail portion having a rear sleeve adapted to support a rear wheel.

Preferably, at least some of the portions of the frame are monocoques and make use of curved stressed skins, strategic use of variations in wall thicknesses, inclusion of ribs, possible inclusion of spars, and other structural techniques that minimize weight and place strength where it is needed. The monocoque parts of the frame can be thought of as miniature aircraft structures and can make use of the sophisticated structural techniques of aircraft construction.

The portions of the frame that are monocoques may consist of at least two unitary members, each of which is approximately a lateral half of the portion and which meet and are joined along mating edges. Members of this form can be made by casting, stamping, or machining, or a combination of these and other material forming methods and can be joined by adhesive, mechanical or thermal connections.

In the preferred embodiments, the nose portion, the center portion, and the tail portion are separate members. A rear end portion of the nose member overlaps a medial portion of the center member, and a front end portion of the tail member overlaps a medial portion of the center member. Detachable fasteners join the members in the overlapping portions. This modular construction permits simpler and more economical mass production of the components of the modules, provides ease of assembly of the modules, reduces labor costs of both manufacture and assembly of the modules and the frame, and allows the frame to be shipped in parts, which are easily assembled by a dealer or by the purchaser. When a frame is damaged, only damaged modules require replacement, and undamaged modules can be reused in the repaired frame. In an advantageous arrangement, the nose member overlaps the center member on one side, and the tail member overlaps the center member on the other side. Such an arrangement permits separate detachment and reattachment of the nose and tail members.

The fasteners may include a first plurality of bolts passing through holes in the rear portion of the nose member and received in threaded holes in the medial portion of the center member and a second plurality of bolts passing through holes in the front portion of the tail member and received in threaded holes in the medial portion of the center member.

The fastening system, preferably, includes tapered bushings interposed between the members around each bolt and matching tapered recesses in the members receiving portions of the bushings so as to precisely orient the members relative to each other and ensure tightness in the joints.

For a better understanding of the invention, reference may be made to the following description of exemplary embodiments, taken in conjunction with the accompanying drawings.

DESCRIPTION OF THE DRAWINGS

FIGS. 6, 7 and 8 are side elevational views of the nose member, center member and tail member of the frame of FIGS. 4 and 5;

FIG. 9 is a partial exploded top cross-sectional view of the frame of FIGS. 4 and 5;

DESCRIPTION OF THE EMBODIMENTS

The bicycle shown in FIG. 1 incorporates several highly unique features, which include those described and shown in the following patent applications that are filed concurrently with the present application and that are hereby incorporated by reference into the present specification:

Ser. No. 08/122,143, entitled "Bicycle Wheel Mount", U.S. Pat. No. 5,390,947;

Ser. No. 08/122,147, entitled "Bicycle Bottom Bracket/Crank Assembly", U.S. Pat. No. 5,335,928 (Aug. 9, 1994);

Ser. No. 08/122,142, entitled "Bicycle With Trailing Arm Suspensions";

Ser. No. 08/122,097, entitled "Bicycle Headset", U.S. Pat. No. 5,380,027 (Jan. 10, 1995).

Figure 1:
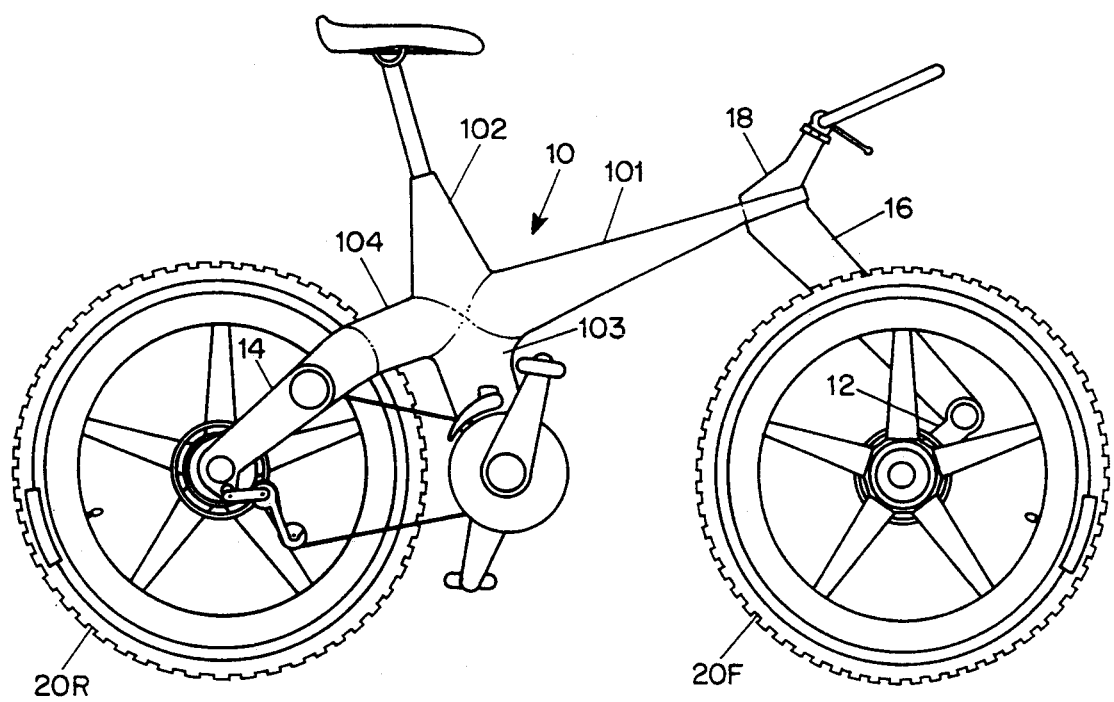
FIG. 1 is a side elevational view of a bicycle having an embodiment of the frame.

Many of the structural components of the bicycle of FIG. 1 are of monocoque construction, including the frame 10, as described below, the swing arms 12 and 14 of the trailing arm wheel suspensions, the front wheel-mounting arm member 16, and the handlebar support member 18, which is affixed to the wheel-mounting arm member 16 and rotatably mounted in a collar at the front of the frame 10 by a unique headset assembly. The frame is generally "t"-shaped (the "t" being oriented sideways to present an inclined nose portion 101, a center portion having a seat support arm 102 and a bottom bracket/crank support arm 103, and a short, bent rear leg portion 104, to which the rear swing arm 14 is attached. Unlike conventional bicycles, in which the wheels are carried on axles extending between members that straddle the wheels (front fork legs and rear triangles), the front and rear wheels 20F and 20R (which are preferably identical) are mounted on one side of the respective swing arms 12 and 14, which permits them to be removed and replaced laterally rather than vertically. Where used, the monocoque form of the structural components of the bicycle makes them strong and rigid but permits them to be of light weight by strategic use of geometry and construction techniques based on aircraft structural design concepts.

Another aspect of the construction of the bicycle is the use of thin wall large diameter angular contact bearings in all pivot connections and journals, including the steering headset, wheel journals, swing arms of the trailing arm suspensions, and the bottom bracket assembly. Thin wall large diameter angular contact bearings allow large moments to be applied to the supported members with low bearing loads due to torques applied to the supported members, occupy a minimum of space, increase efficiency, and enhance stability and durability, as compared with the multiple bearing sets within relatively small sleeves that are used in conventional headsets, bottom brackets and wheel journals.

Figure 2:
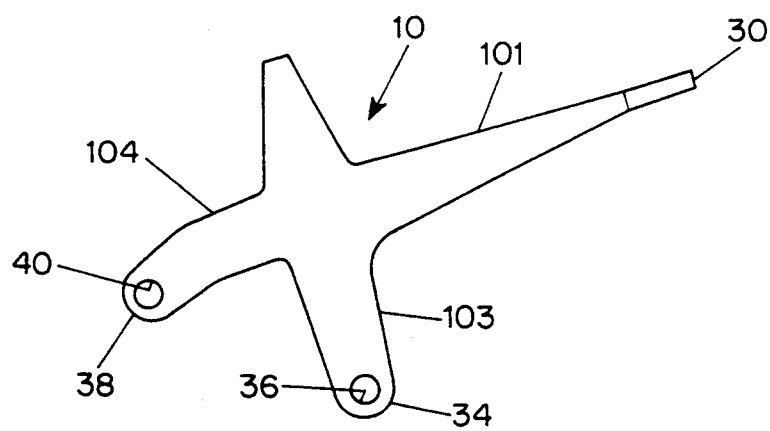
FIG. 2 is a side elevational view of the frame of the bicycle of FIG. 1.
Figure 3:
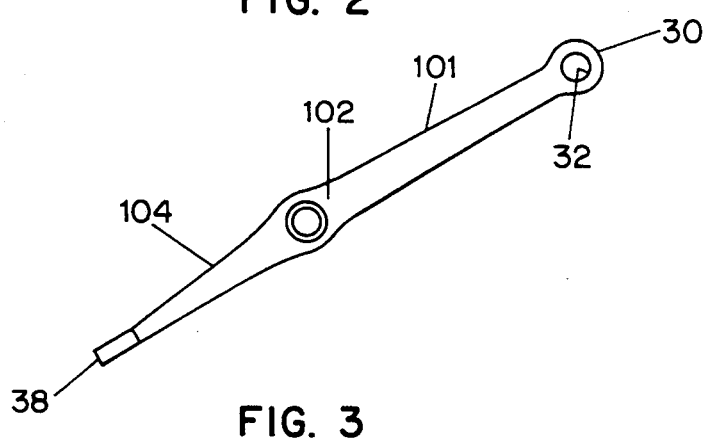
FIG. 3 is a top plan view of the frame of the bicycle of FIG. 1.
Figure 4:
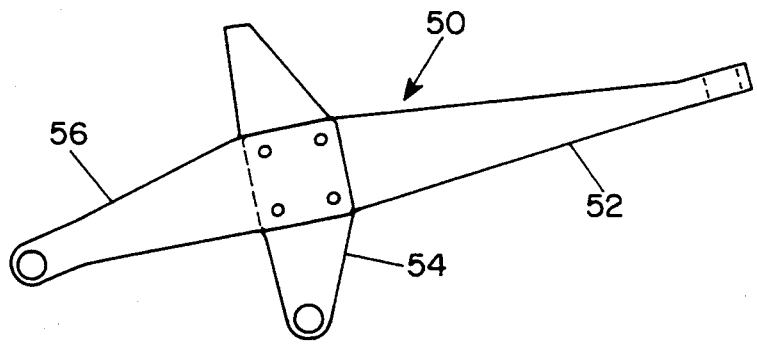
FIG. 4 is a side elevational view of as assembled modular frame.
Figure 5:
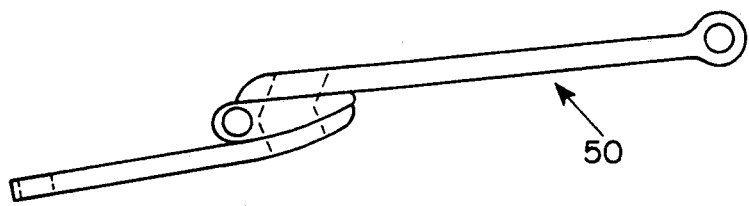
FIG. 5 is a top plan view of the frame of FIG. 4.

As shown in FIG. 2 and 3, the frame of the bicycle of FIG. 1 is unitary (as distinguished from modular with detachable parts) and is made by machining parts from solid chunks of metal, preferably aluminum. Modern high-speed CNC machines can easily and quickly turn out intricate pieces. The components of the frame are made in half sections, each having the desired outside shape and "hogged out" on the inside to provide the desired wall thicknesses, ribs, bosses and the like. The components are then assembled and joined at mating edges by adhesive bonding, mechanical connections or welding (or combinations of joining methods).

The nose portion 101 is tapered vertically and may be tapered laterally to accommodate efficiently the bending stresses due to moments, which increase from the front to the rear. For the same reason, the seat support arm 102 and bottom bracket arm 103 are tapered. At the front of the nose portion is a sleeve portion 30 having a large diameter hole 32 for the headset. A sleeve portion 34 at the bottom of the bottom bracket arm has a hole that receives the bottom bracket/crank assembly. And a sleeve 38 at the rear of the tail portion 104 has a hole 40 for the swing arm mounting. A hole 42 in the seat support arm receives a seat post and a lock assembly for adjusting seat height.

The frame 50 shown in FIGS. 4 to 8 is of the same "t"-shaped layout that of FIGS. 1 to 3 but is of modular construction in that it consists of a nose member 52, a center member 54, and a tail member 56 that are detachable from each other. A rear end portion of the nose member and the front end of the tail member straddle a medial portion of the center member. The three members are fastened together by a fastening system that uses detachable fasteners so that the frame can be disassembled, if necessary, for repair. The fastening system also allows the frame to be shipped in parts for assembly by a dealer or the purchaser. Modular parts permit sharing of mass-produced modules among bicycles of different sizes and models.

Figure 10:
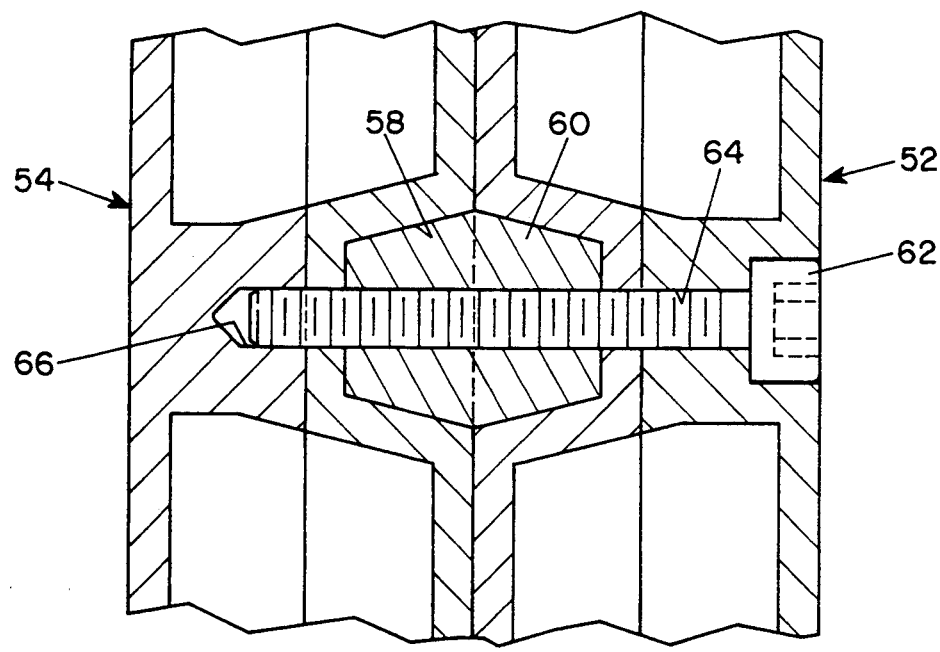
FIG. 10 is a detail cross-sectional view of a typical fastener arrangement for joining frame modules.

A suitable fastening system is shown in FIGS. 9 and 10. The overlapping portions of each member have tapered seats 58 for doubly tapered spacer/locators 60. Bolts 62 pass through holes 64 in the respective members 52 and 56, through the corresponding spacer and thread into threaded holes 66 in the center member. The spacers ensure precise orientations of the members and prevent any laxity after they are assembled.

Figures 11, 12:
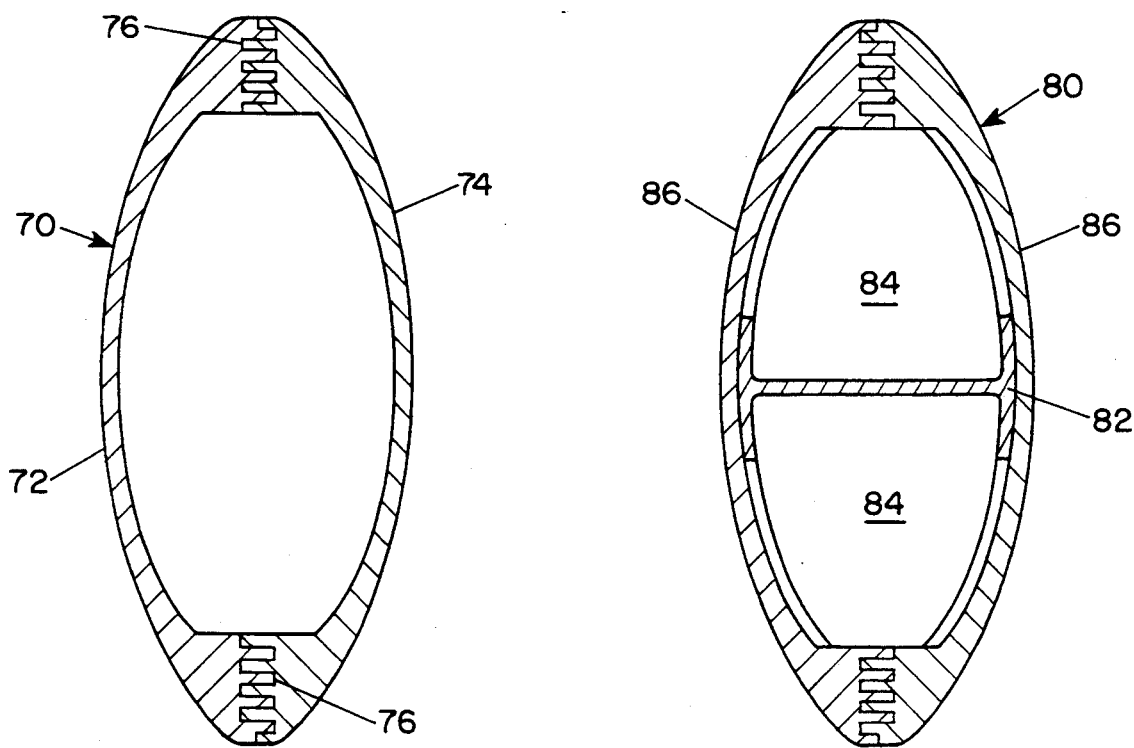
FIG. 11 is an end cross-sectional view of one typical monocoque frame portion.
FIG. 12 is an end cross-sectional view of another monocoque frame portion.

As mentioned above, the members or portions of the members of frames embodying the present invention are of monocoque construction. As shown in FIG. 11, a typical monocoque member 70 consists of the two parts 72 and 74, each constituting about one half of the member. Each part has thin skins, the thickness of which may vary from place to place. Stiffening ribs, bosses, and other features (not shown) are provided where needed. The parts 72 and 74 are then joined along mating edges. In FIG. 11, the edges have interfitting ribs and grooves 76, which provide a good mechanical connection and large areas in shear for strong bonding by an adhesive. Monocoque frame members may also incorporate lengthwise spars 82 and lateral ribs 84 joined to skins 86, as in the member 80 shown in FIG. 12. The joints at the mating edges shown in FIG. 12 are not required.

Metals, especially aluminum, are preferred for the frame, but composite materials can be used. Combinations of metal skins and composite materials bonded to the skins for stiffening can provide good results.

We claim:

1. A bicycle comprising a frame having a single tapered monocoque nose portion, the nose portion having a front sleeve adapted to receive a front wheel-mounting member, a center portion having a single monocoque tapered upper arm extending upwardly from a juncture with the nose portion and adapted to support a seat and a single monocoque tapered lower arm extending downwardly from a juncture with the nose portion and having a bottom sleeve adapted to support a bottom bracket/crank assembly, and a single monocoque tail portion extending rearwardly from a juncture with the center portion and having a pivot mounting at a rear end thereof, a single front-wheel-mounting member rotatably mounted in the front sleeve, a front wheel mounted entirely and solely on one lateral side of the wheel-mounting member, and a rear wheel mounted entirely and solely on one lateral side of the tail portion of the frame.

2. A bicycle according to claim 1 wherein at least one of said portions of the frame is composed of at least two unitary members, each of which is a lateral half of said portion and which meet and are joined along mating edges.

3. A bicycle according to claim 1 wherein the front wheel and rear wheel are mounted on opposite lateral sides of the bicycle.

4. A bicycle according to claim 1 and further comprising resilient mounting means mounting the rear wheel on the tail portion of the frame.

5. A bicycle according to claim 1 wherein the resilient mounting means includes a rear trailing arm pivotally mounted on a pivot mounting on the tail portion of the frame, extending downwardly and rearwardly from the pivot mounting and having a wheel mount at a lower rear end thereof and means biasing the rear trailing arm forwardly and downwardly about the pivot mounting.

6. A bicycle according to claim 1 and further comprising resilient mounting means mounting the front wheel on the wheel-mounting member.

7. A bicycle according to claim 6 wherein the resilient mounting means includes a front trailing arm pivotally mounted on a pivot mounting on the wheel-mounting member, extending downwardly and rearwardly from the pivot mounting and having a wheel mount at a lower rear end thereof and means biasing the front trailing arm forwardly and downwardly about the pivot mounting.

8. A bicycle according to claim 1 wherein the nose portion, center portion and tail portion are separate members, a rear end portion of the nose member overlaps a medial portion of the center member, and a front end portion of the tail member overlaps a medial portion of the center member, and further comprising detachable fastener means joining the members in the overlapping portions.

9. A bicycle according to claim 1 wherein the nose portion, center portion and tail portion are separate members, a rear end portion of the nose member overlaps a medial portion of the center member on one side of the center member, and a front end portion of the tail member overlaps a medial portion of the center member on the other side of the center member, and further comprising detachable fastener means joining the members in the overlapping portions.

10. A bicycle according to claim 9 wherein the fastener means includes a first plurality of bolts passing through holes in the rear portion of the nose member and received in threaded holes in the medial portion of the center member and a second plurality of bolts passing through holes in the front portion of the tail member and received in threaded holes in the medial portion of the center member.

11. A bicycle according to claim 10 wherein the fastening means further includes tapered bushings interposed between the members around each bolt and matching tapered recesses in the members receiving portions of the bushings so as to precisely orient the members relative to each other.

12. A bicycle comprising a frame having a single tapered monocoque nose portion, the nose portion having a front sleeve adapted to receive a front wheel-mounting member, a center portion having a single monocoque tapered upper arm extending upwardly from a juncture with the nose portion and adapted to support a seat and a single monocoque tapered lower arm extending downwardly from a juncture with the nose portion and having a bottom sleeve adapted to support a bottom bracket/crank assembly, and a single monocoque tail portion extending rearwardly from a juncture with the center portion and having a pivot mounting at a rear end thereof, a single front-wheel-mounting member rotatably mounted in the front sleeve and having a pivot mounting at a lower end thereof, a front trailing arm pivotally mounted on the pivot mounting of the front wheel-mounting member extending downwardly and rearwardly from the pivot mounting and having a wheel mount at a lower rear end thereof, means biasing the front trailing arm forwardly and downwardly about the pivot mounting, a rear trailing arm pivotally mounted on the pivot mounting of the tail portion of the frame, extending downwardly and rearwardly from the pivot mounting and having a wheel mount at a lower rear end thereof, means biasing the rear trailing arm forwardly and downwardly about the pivot mounting, a front wheel mounted on the wheel mount of the front trailing arm entirely on one side of the front trailing arm and a portion of the front wheel-mounting member, and a rear wheel mounted on the wheel mount of the rear trailing arm entirely on one side of the rear trailing arm and a portion of the tail portion of the frame.

13. A bicycle according to claim 12 wherein the nose portion, center portion and tail portion are separate members, a rear end portion of the nose member overlapping a medial portion of the center member, and a front end portion of the tail member overlapping a medial portion of the center member, and detachable fastener means joining the members in the overlapping portions.

14. A bicycle according to claim 12 wherein the nose portion, center portion and tail portion are separate members, a rear end portion of the nose member overlaps a medial portion of the center member on one side of the center member, and a front end portion of the tail member overlaps a medial portion of the center member of the other side of the center member, and further comprising detachable fastener means joining the members in the overlapping portions.

15. A bicycle according to claim 14 wherein the fastener means includes a first plurality of bolts passing through holes in the rear portion of the nose member and received in threaded holes in the medial portion of the center member and a second plurality of bolts passing through holes in the front portion of the tail member and received in threaded holes in the medial portion of the center member.

16. A bicycle according to claim 15 wherein the fastening means further includes tapered bushings interposed between the members around each bolt and matching tapered recesses in the members receiving portions of the bushings so as to precisely orient the members relative to each other.

17. A bicycle according to claim 12 wherein the front trailing arm is a monocoque.

18. A bicycle according to claim 12 wherein the rear trailing arm is a monocoque.

19. A bicycle according to claim 12 wherein the front wheel-mounting member is a monocoque.

* * * * *